(12) United States Patent
Sarkar et al.

(10) Patent No.: US 9,706,602 B2
(45) Date of Patent: Jul. 11, 2017

(54) MULTIPLE WIRELESS IDENTITIES FOR A MOBILE DEVICE

(71) Applicant: Plantronics, Inc., Santa Cruz, CA (US)

(72) Inventors: Shantanu Sarkar, San Jose, CA (US); Timothy P Johnston, Los Gatos, CA (US); Cary Bran, Seattle, WA (US); Burton Joe, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 216 days.

(21) Appl. No.: 14/612,125

(22) Filed: Feb. 2, 2015

(65) Prior Publication Data

US 2016/0227395 A1    Aug. 4, 2016

(51) Int. Cl.
| | |
|---|---|
| H04B 7/00 | (2006.01) |
| H04W 88/06 | (2009.01) |
| H04W 4/02 | (2009.01) |
| H04L 29/06 | (2006.01) |
| H04W 12/08 | (2009.01) |
| H04L 29/12 | (2006.01) |

(52) U.S. Cl.
CPC .......... *H04W 88/06* (2013.01); *H04L 63/102* (2013.01); *H04L 63/105* (2013.01); *H04W 4/02* (2013.01); *H04W 12/08* (2013.01); *H04L 61/6022* (2013.01); *H04L 61/6077* (2013.01)

(58) Field of Classification Search
CPC .............................. H04W 88/06; H04W 48/18
USPC ...................................... 455/500, 574, 127.4
See application file for complete search history.

(56) References Cited

U.S. PATENT DOCUMENTS

| | | | | |
|---|---|---|---|---|
| 8,904,197 | B2* | 12/2014 | Piersol | G06F 1/3265 455/127.5 |
| 9,326,235 | B1* | 4/2016 | Wong | H04W 52/028 |
| 9,357,414 | B2* | 5/2016 | Kim | H04W 24/10 |
| 2004/0204175 | A1* | 10/2004 | Karaoguz | H04B 1/1615 455/572 |
| 2014/0169216 | A1* | 6/2014 | Mansson | H04W 48/18 370/254 |
| 2015/0163743 | A1* | 6/2015 | Narasimha | H04W 52/0254 370/311 |
| 2016/0057661 | A1* | 2/2016 | Nayak | H04W 36/0022 370/331 |

* cited by examiner

*Primary Examiner* — Dung Hong

(57) ABSTRACT

Apparatus having corresponding methods and computer-readable media comprise: a processor configured to execute one or more applications associated with a plurality of identities; and one or more transceivers configured to transceive first wireless signals responsive to a first enablement signal, and to transceive second wireless signals responsive to a second enablement signal; wherein the first wireless signals represent a first transceiver identifier associated with a first one of the identities; wherein the second wireless signals represent a second transceiver identifier associated with a second one of the identities; wherein the processor is further configured to assert the first enablement signal responsive to occurrence of one or more first events; and wherein the processor is further configured to assert the second enablement signal responsive to occurrence of one or more second events.

21 Claims, 5 Drawing Sheets

MULTIPLE WIRELESS IDENTITIES FOR A MOBILE DEVICE

FIELD

The present disclosure relates generally to the field of wireless communications. More particularly, the present disclosure relates to the identities employed during wireless communications.

BACKGROUND

Wireless communications have become indispensable in modern life. Mobile devices are used for phone calls, exchanging electronic messages, shopping, banking, and for making payments. Some of these wireless transactions require more security than others. For example, while one may want little security for accepting a store coupon delivered wirelessly to a mobile device, one will want much greater security when using that mobile device to wirelessly transfer funds between banking accounts.

SUMMARY

In general, in one aspect, an embodiment features an apparatus comprising: a processor configured to execute one or more applications associated with a plurality of identities; and one or more transceivers configured to transceive first wireless signals responsive to a first enablement signal, and to transceive second wireless signals responsive to a second enablement signal; wherein the first wireless signals represent a first transceiver identifier associated with a first one of the identities; wherein the second wireless signals represent a second transceiver identifier associated with a second one of the identities; wherein the processor is further configured to assert the first enablement signal responsive to occurrence of one or more first events; and wherein the processor is further configured to assert the second enablement signal responsive to occurrence of one or more second events.

Embodiments of the apparatus may include one or more of the following features. In some embodiments, the one or more transceivers comprise: a first transceiver configured to transceive the first wireless signals responsive to the first enablement signal; and a second transceiver configured to transceive the second wireless signals responsive to the second enablement signal. In some embodiments, the first transceiver identifier comprises a first media access control (MAC) address; and the second transceiver identifier comprises a second MAC address. In some embodiments, the one or more transceivers comprise: a transceiver; and one or more registers configured to store the first and second transceiver identifiers; wherein the transceiver is configured to access the first transceiver identifier responsive to the first enablement signal; and wherein the transceiver is further configured to access the second transceiver identifier responsive to the second enablement signal. In some embodiments, the first transceiver identifier comprises a first media access control (MAC) address; and the second transceiver identifier comprises a second MAC address. In some embodiments, the first one of the identities is associated with a security credential; and the second one of the identities is not associated with the security credential. In some embodiments, the events include at least one of: the apparatus being at a first predetermined location; the apparatus not being at a second predetermined location; the apparatus being near a first selected object; the apparatus not being near a second selected object; the apparatus being near a first selected person or group of persons; the apparatus not being near a second selected person or group of persons; occurrence of a time of day; occurrence of a scheduled task; and reception by the one or more transceivers of a signal associated with one of the applications.

In general, in one aspect, an embodiment features computer-readable media embodying instructions executable by a computer to perform functions comprising: executing one or more applications associated with a plurality of identities; and enabling one or more transceivers to transceive first wireless signals responsive to occurrence of one or more first events, wherein the first wireless signals represent a first transceiver identifier associated with a first one of the identities; and enabling the one or more transceivers to transceive second wireless signals responsive to occurrence of one or more second events, wherein the second wireless signals represent a second transceiver identifier associated with a second one of the identities.

Embodiments of the computer-readable media may include one or more of the following features. In some embodiments, the one or more transceivers include a first transceiver and a second transceiver, and the functions further comprise: enabling the first transceiver to transceive the first wireless signals responsive to occurrence of one or more of the first events; and enabling the second transceiver to transceive the second wireless signals responsive to occurrence of one or more of the second events. In some embodiments, the first transceiver identifier comprises a first media access control (MAC) address; and the second transceiver identifier comprises a second MAC address. In some embodiments, the functions further comprise: storing the first and second transceiver identifiers; providing the first transceiver identifier to one of the transceivers responsive to occurrence of one or more of the first events; and providing the second transceiver identifier to the one of the transceivers responsive to occurrence of one or more of the second events. In some embodiments, the first transceiver identifier comprises a first media access control (MAC) address; and the second transceiver identifier comprises a second MAC address. In some embodiments, the first one of the identities is associated with a security credential; and the second one of the identities is not associated with the security credential. In some embodiments, the events include at least one of: the computer being at a first predetermined location; the computer not being at a second predetermined location; the computer being near a first selected object; the computer not being near a second selected object; the computer being near a first selected person or group of persons; the computer not being near a second selected person or group of persons; occurrence of a time of day; occurrence of a scheduled task; and reception by the one or more transceivers of a signal associated with one of the applications.

In general, in one aspect, an embodiment features a method comprising: executing one or more applications associated with a plurality of identities; and enabling one or more transceivers to transceive first wireless signals responsive to occurrence of one or more first events, wherein the first wireless signals represent a first transceiver identifier associated with a first one of the identities; and enabling the one or more transceivers to transceive second wireless signals responsive to occurrence of one or more second events, wherein the second wireless signals represent a second transceiver identifier associated with a second one of the identities.

Embodiments of the method may include one or more of the following features. In some embodiments, the one or more transceivers include a first transceiver and a second transceiver, and the method further comprises: enabling the first transceiver to transceive the first wireless signals responsive to occurrence of one or more of the first events; and enabling the second transceiver to transceive the second wireless signals responsive to occurrence of one or more of the second events. In some embodiments, the first transceiver identifier comprises a first media access control (MAC) address; and the second transceiver identifier comprises a second MAC address. Some embodiments comprise storing the first and second transceiver identifiers; providing the first transceiver identifier to one of the transceivers responsive to occurrence of one or more of the first events; and providing the second transceiver identifier to the one of the transceivers responsive to occurrence of one or more of the second events. In some embodiments, the first transceiver identifier comprises a first media access control (MAC) address; and the second transceiver identifier comprises a second MAC address. In some embodiments, the first one of the identities is associated with a security credential; and the second one of the identities is not associated with the security credential.

The details of one or more implementations are set forth in the accompanying drawings and the description below. Other features will be apparent from the description and drawings, and from the claims.

Figure 1:
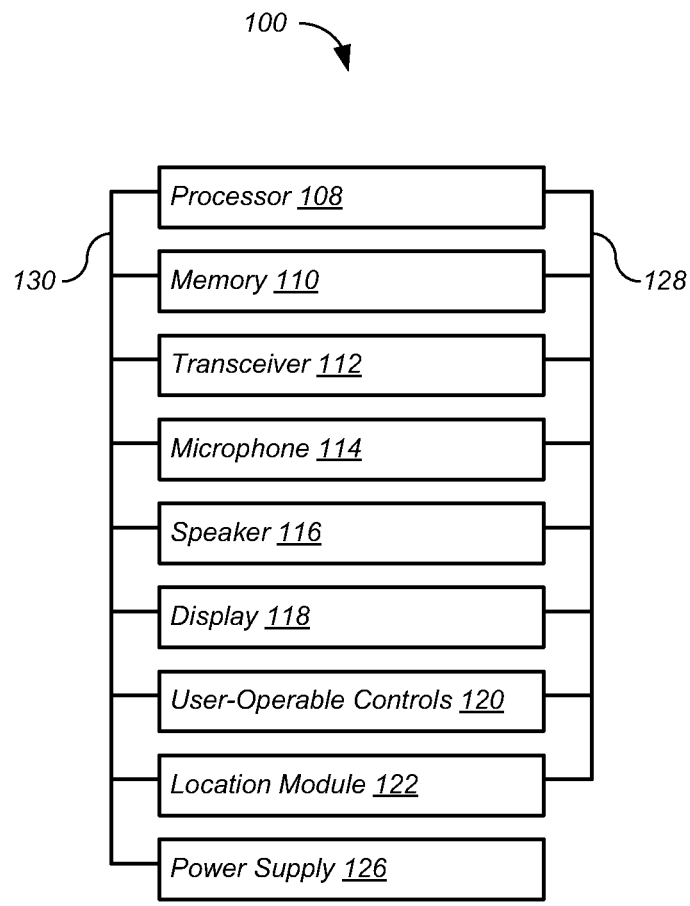
FIG. 1 shows elements of a mobile communication device according to one embodiment.

The leading digit(s) of each reference numeral used in this specification indicates the number of the drawing in which the reference numeral first appears.

DETAILED DESCRIPTION

Embodiments of the present disclosure provide multiple wireless identities for a mobile device. Each wireless identity is associated with a transceiver identifier. In one embodiment, a transceiver includes two or more transmitters, and each transmitter has a different transceiver identifier. In another embodiment, a transceiver includes a single transmitter associated with multiple transceiver identifiers. In one example, each transceiver identifier is a media access control (MAC) address.

Each identity is associated with one or more applications. For example, one of the identities may be associated with a shopping application, while another may be associated with a banking application. Each identity may be associated with a different level of security, a different amount of personal information, or the like. For example, a "secure" identity may be associated with a particular security credential, while a "promiscuous" identity may not be associated with that security credential. An identity may be associated with multiple applications. Multiple identities may be associated with a single application.

The identities may be enabled and disabled automatically based on the occurrence of one or more events. The events may include being at a predetermined location, not being at a predetermined location, occurrence of a time of day, occurrence of a scheduled task, reception of a signal associated with one of the applications, being near a selected object, not being near a selected object, being near a selected person or group of persons, not being near a selected person or group of persons, and the like. For example, a "secure" identity associated with high levels of security and personal information may be enabled only while at work during working hours, while a "promiscuous" identity associated with low levels of security and personal information may be enabled while at a shopping mall on a weekend. Being near an object could include, for example, being near a firearm, a radio-linked code key for international wire transfers, or the like. Being near a person could include, for example, being near another person where two people are required to open a vault or the like. Other features are contemplated as well.

FIG. 1 shows elements of a mobile communication device 100 according to one embodiment. Although in the described embodiment elements of the mobile communication device 100 are presented in one arrangement, other embodiments may feature other arrangements. For example, elements of the mobile communication device 100 may be implemented in hardware, software, or combinations thereof.

Referring to FIG. 1, the mobile communication device 100 may include one or more of a transceiver 112, a processor 108, a memory 110, a microphone 114, a speaker 116, a display 118, one or more user-operable controls 120, a location module 122, and a power supply 126. The mobile communication device 100 may include other elements as well.

The processor 108 may execute one or more applications associated with a plurality of identities. The processor 108 may communicate with other elements of the mobile communication device 100 over one or more communication busses 128. The elements of mobile communication device 100 may receive power from the power supply 126 over one or more power rails 130. Various elements of the mobile communication device 100 may be implemented as one or more integrated circuits. The mobile communication device 100 may be implemented as a smartphone, a wearable electronic device, or the like.

The transceiver 112 may employ any communication protocol, including wired and wireless communication protocols. The wireless protocols may include Bluetooth, Bluetooth Low-Energy (BLE), Wi-Fi, Digital Enhanced Cordless Telecommunications (DECT), near-field communications (NFC), and the like. The transceiver 112 may employ multiple communication protocols. The processor 108 may include digital signal processors, analog-to-digital converters, digital-to-analog converters, and the like.

The display 118 may be implemented as a touch screen or the like. The user-operable controls 120 may include buttons, slide switches, capacitive sensors, touch screens, and the like. The location module 122 may include an e-compass, accelerometers, gyroscopes, an altimeter, and the like. The location module 122 may include a dedicated receiver to receive Global Positioning System (GPS) signals or the like, and may include a location processor to process the received signals. The location processor may employ wireless signals received by the transceiver 112. The location module 122 may receive messages that include location information, and may employ those messages in location determination.

Figure 2:
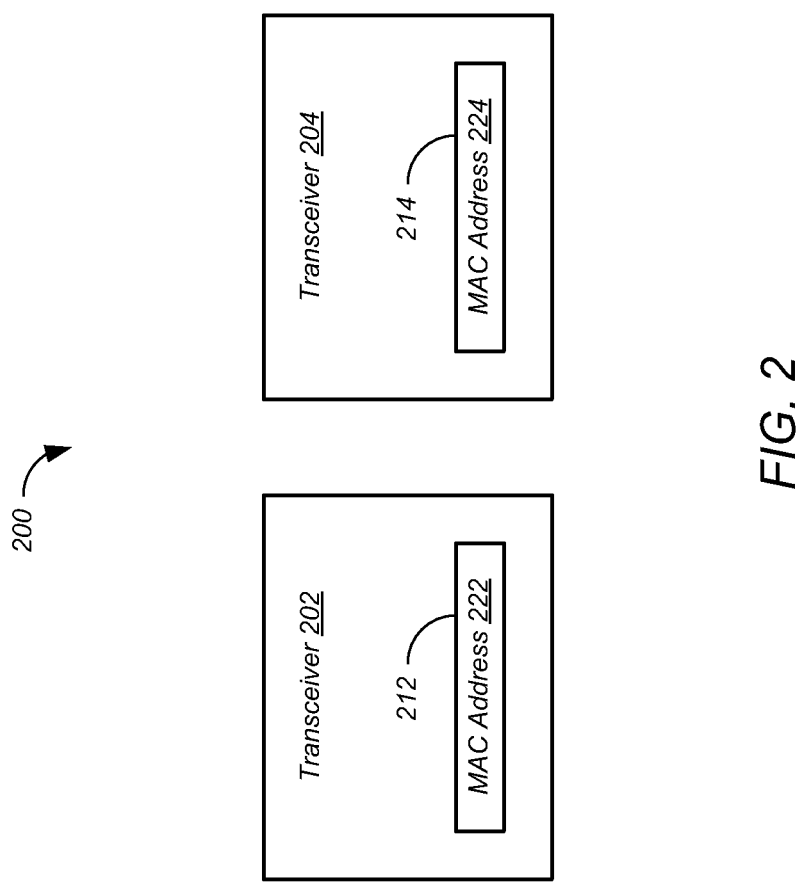
FIG. 2 shows elements of a transceiver according to an embodiment having two transceivers, each with a different transceiver identifier.

FIG. 2 shows elements of a transceiver 200 according to an embodiment having two transceivers, each with a different transceiver identifier. The transceiver 200 may be used to implement the transceiver 112 of FIG. 1. Although in the described embodiment elements of the transceiver 200 are presented in one arrangement, other embodiments may feature other arrangements. For example, elements of the transceiver 200 may be implemented in hardware, software, or combinations thereof.

Referring to FIG. 2, the transceiver 200 includes two transceivers 202 and 204. Each transceiver 202, 204 includes a respective register 212, 214. Each register 212, 214 stores a respective media access control (MAC) address 222, 224 or other respective transceiver identifiers. Each transceiver 202, 204 may employ its MAC address 222, 224 in radio signals transmitted by the transceiver 202, 204. Each media access control (MAC) address 222, 224 may be associated with a respective one of a plurality of identities. While the described embodiment employs only two transceivers, two MAC addresses, and two identities, other embodiments may employ greater numbers of transceivers, MAC addresses, and identities.

Figure 3:
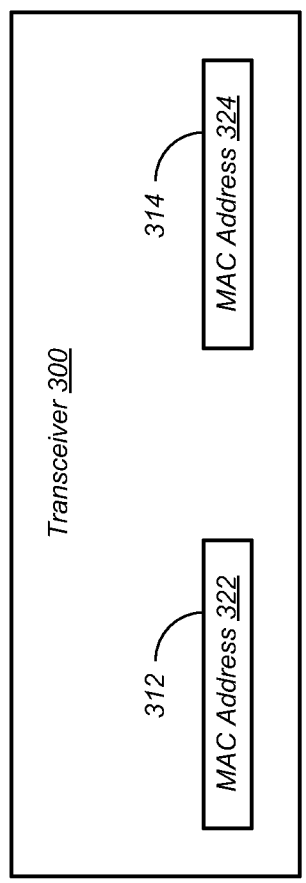
FIG. 3 shows elements of a transceiver according to an embodiment having one transmitter with two different transceiver identifiers.

FIG. 3 shows elements of a transceiver 300 according to an embodiment having one transmitter with two different transceiver identifiers. The transceiver 300 may be used to implement the transceiver 112 of FIG. 1. Although in the described embodiment elements of the transceiver 300 are presented in one arrangement, other embodiments may feature other arrangements. For example, elements of the transceiver 300 may be implemented in hardware, software, or combinations thereof.

Referring to FIG. 3, the transceiver 300 includes two registers 312, 314. Each register 312, 314 stores a respective media access control (MAC) address 322, 324 or other respective transceiver identifiers. The transceiver 300 may employ either MAC address 322, 324 in radio signals transmitted by the transceiver 300. Each media access control (MAC) address 322, 324 may be associated with a respective one of a plurality of identities. While the described embodiment employs only two MAC addresses and two identities, other embodiments may employ greater numbers of MAC addresses and identities.

Figure 4:
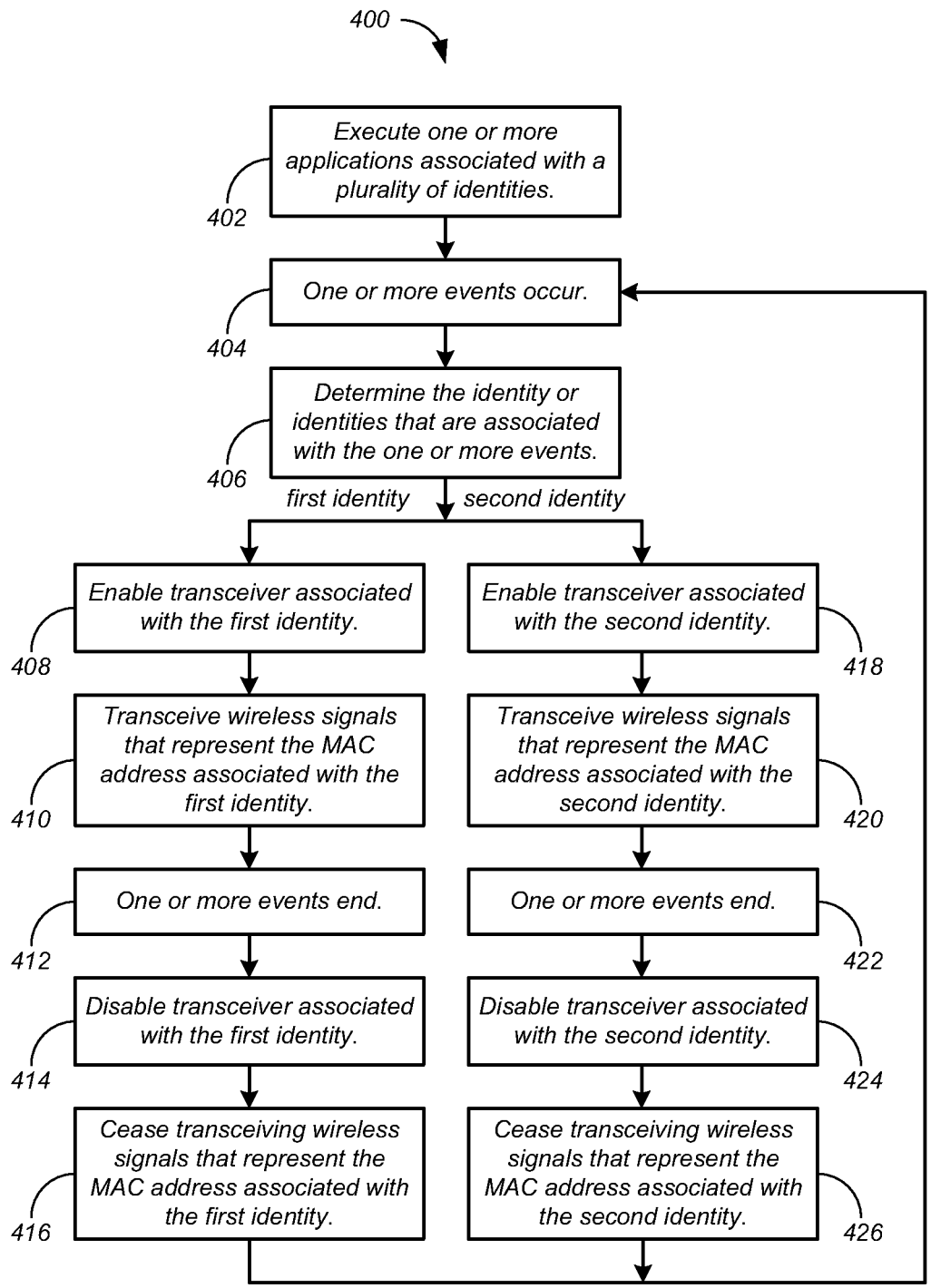
FIG. 4 shows a process for the mobile communication device of FIG. 1 according to the transceiver embodiment of FIG. 2.

FIG. 4 shows a process 400 for the mobile communication device 100 of FIG. 1 according to the transceiver embodiment of FIG. 2. Although in the described embodiments the elements of process 400 are presented in one arrangement, other embodiments may feature other arrangements. For example, in various embodiments, some or all of the elements of process 400 can be executed in a different order, concurrently, and the like. Also some elements of process 400 may not be performed, and may not be executed immediately after each other. In addition, some or all of the elements of process 400 can be performed automatically, that is, without human intervention.

Referring to FIG. 4, at 402, the processor 108 may execute one or more applications associated with a plurality of identities. Each identity may be associated with one or more of the applications. For example, one of the identities may be associated with a shopping application, while another may be associated with a banking application. Each identity may be associated with a different level of security, a different amount of personal information, and the like. An identity may be associated with multiple applications. Multiple identities may be associated with a single application. Each identity may be associated with one of the MAC addresses 222, 224. In this example, a first identity is associated with MAC address 222, and a second identity is associated with MAC address 224.

The identities may be enabled and disabled automatically based on the occurrence of one or more events. The events may include being at a predetermined location, not being at a predetermined location, occurrence of a time of day, occurrence of a scheduled task, reception of a signal associated with one of the applications, and the like. Information describing the events may be stored in the memory 110. A user of the device 100 may configure the events using the user-operable controls 120, the display 118, the microphone 114, the speaker 116, and the like.

At 404, one or more of the events may occur. At 406, the processor 108 may determine the identity or identities that are associated with the one or more events. At 408, responsive to the one or more events being associated with the first identity, the processor 108 may enable the first identity. In particular, the processor 108 may enable the transceiver 202 associated with the first identity. For example, the processor 108 may assert a first enablement signal over the one or more communication busses 128.

At 410, responsive to being enabled by the processor 108, the transceiver 202 may transceive wireless signals that represent the MAC address 222, 224 associated with the first identity. In this example, the MAC address 222, 224 associated with the first identity is MAC address 222. The transceiver may be enabled responsive to the assertion of the first enablement signal over the one or more communication busses 128.

At 412, the one or more events may end. At 414, responsive to the one or more events ending, the processor 108 may disable the transceiver 202. For example, the processor 108 may negate the first enablement signal over the one or more communication busses 128.

At 416, responsive to being disabled by the processor 108, the transceiver 202 may cease to transceive wireless signals that represent the MAC address 222 associated with the first identity. The transceiver 202 may be disabled responsive to the negation of the first enablement signal over the one or more communication busses 128. The process 400 may then resume, at 404.

At 418, responsive to the one or more events being associated with the second identity, the processor 108 may enable the second identity. In particular, the processor 108 may enable the transceiver 204 associated with the second identity. For example, the processor 108 may assert a second enablement signal over the one or more communication busses 128.

At 420, responsive to being enabled by the processor 108, the transceiver 204 may transceive wireless signals that represent the MAC address 222, 224 associated with the second identity. In this example, the MAC address 222, 224 associated with the second identity is MAC address 224. The transceiver may be enabled responsive to the assertion of the second enablement signal over the one or more communication busses 128.

At 422, the one or more events may end. At 424, responsive to the one or more events ending, the processor 108 may disable the transceiver 204. For example, the processor 108 may negate the second enablement signal over the one or more communication busses 128.

At 426, responsive to being disabled by the processor 108, the transceiver 204 may cease to transceive wireless signals that represent the MAC address 224 associated with the second identity. The transceiver 204 may be disabled responsive to the negation of the second enablement signal over the one or more communication busses 128. The process 400 may then resume, at 404.

Figure 5:
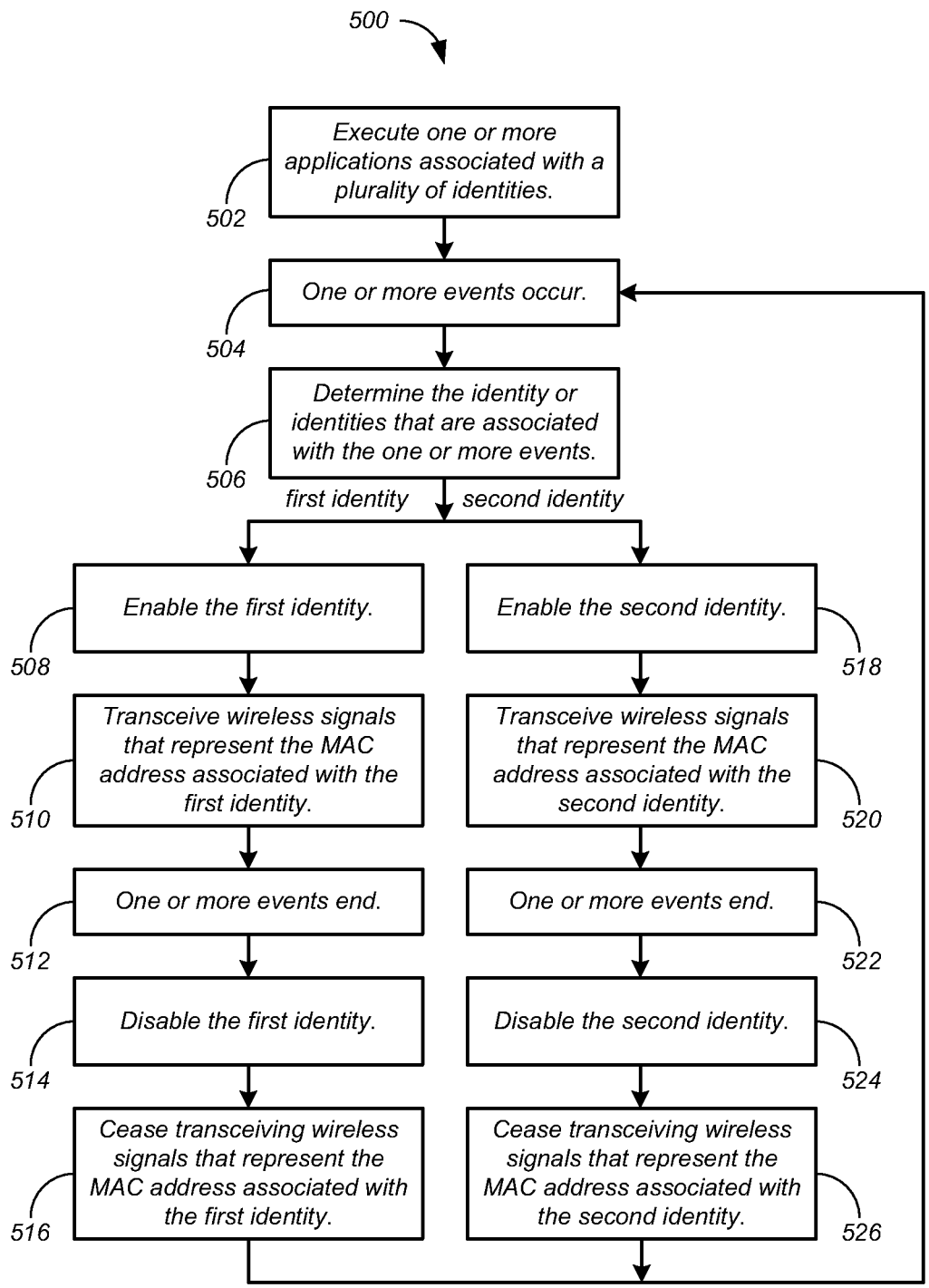
FIG. 5 shows a process for the mobile communication device of FIG. 1 according to the transceiver embodiment of FIG. 3.

FIG. 5 shows a process 500 for the mobile communication device 100 of FIG. 1 according to the transceiver embodiment of FIG. 3. Although in the described embodiments the elements of process 500 are presented in one arrangement, other embodiments may feature other arrangements. For example, in various embodiments, some or all of the elements of process 500 can be executed in a different order, concurrently, and the like. Also some elements of process 500 may not be performed, and may not be executed immediately after each other. In addition, some or all of the elements of process 500 can be performed automatically, that is, without human intervention.

Referring to FIG. 5, at 502, the processor 108 may execute one or more applications associated with a plurality of identities. Each identity may be associated with one or more of the applications. For example, one of the identities may be associated with a shopping application, while another may be associated with a banking application. Each identity may be associated with a different level of security, a different amount of personal information, and the like. An identity may be associated with multiple applications. Multiple identities may be associated with a single application. Each identity is associated with one of the MAC addresses 322, 324. In this example, a first identity is associated with MAC address 322, and a second identity is associated with MAC address 324.

The identities may be enabled and disabled automatically based on the occurrence of one or more events. The events may include being at a predetermined location, not being at a predetermined location, occurrence of a time of day, occurrence of a scheduled task, reception of a signal associated with one of the applications, and the like. Information describing the events may be stored in the memory 110. A user of the device 100 may configure the events using the user-operable controls 120, the display 118, the microphone 114, the speaker 116, and the like.

At 504, one or more of the events may occur. At 506, the processor 108 may determine the identity or identities that are associated with the one or more events. At 508, responsive to the one or more events being associated with the first identity, the processor 108 may enable the first identity. For example, the processor 108 may assert a first enablement signal over the one or more communication busses 128.

At 510, responsive to the first identity being enabled, the transceiver 300 may transceive wireless signals that represent the MAC address 322 associated with the first identity. In particular, the transceiver 300 may access the MAC address 322 associated with the first identity. The transceiver 300 may access the MAC address 322 responsive to the assertion of the first enablement signal over the one or more communication busses 128. Alternatively, the processor 108 may provide the MAC address 322 to the transceiver 300.

At 512, the one or more events may end. At 514, responsive to the one or more events ending, the processor 108 may disable the first identity. For example, the processor 108 may negate the first enablement signal over the one or more communication busses 128.

At 516, responsive to the first identity being disabled, the transceiver 300 may cease to transceive wireless signals that represent the MAC address 322 associated with the first identity. The first identity may be disabled responsive to the negation of the first enablement signal over the one or more communication busses 128. The process 500 may then resume, at 504.

At 518, responsive to the one or more events being associated with a second identity, the processor 108 may enable the second identity. For example, the processor 108 may assert a second enablement signal over the one or more communication busses 128.

At 520, responsive to the second identity being enabled by the processor 108, the transceiver 304 may transceive wireless signals that represent the MAC address 324 associated with the second identity. In particular, the transceiver 300 may access the MAC address 324 associated with the second identity. The transceiver 300 may be enabled responsive to the assertion of the second enablement signal over the one or more communication busses 128. Alternatively, the processor 108 may provide the MAC address 324 to the transceiver 300.

At 522, the one or more events may end. At 524, responsive to the one or more events ending, the processor 108 may disable the transceiver 300. For example, the processor 108 may negate the second enablement signal over the one or more communication busses 128.

At 526, responsive to the second identity being disabled, the transceiver 300 may cease to transceive wireless signals that represent the MAC address 324 associated with the second identity. The second identity may be disabled responsive to the negation of the second enablement signal over the one or more communication busses 128. The process 500 may then resume, at 504.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. An apparatus comprising:
a processor configured to execute one or more applications associated with a plurality of identities associated with different levels of security; and
one or more transceivers configured to transceive first wireless signals responsive to a first enablement signal, and to transceive second wireless signals responsive to a second enablement signal;
wherein the first wireless signals represent a first transceiver identifier associated with a first one of the identities;
wherein the second wireless signals represent a second transceiver identifier associated with a second one of the identities, and different than the first transceiver identifier;
wherein the processor is further configured to assert the first enablement signal responsive to occurrence of a first set of events; and
wherein the processor is further configured to assert the second enablement signal responsive to occurrence of a second set of events different than the first set.

2. The apparatus of claim 1, wherein the one or more transceivers comprise:
a first transceiver configured to transceive the first wireless signals responsive to the first enablement signal; and
a second transceiver configured to transceive the second wireless signals responsive to the second enablement signal.

3. The apparatus of claim 2, wherein:
the first transceiver identifier comprises a first media access control (MAC) address; and
the second transceiver identifier comprises a second MAC address.

4. The apparatus of claim 1, wherein the one or more transceivers comprise:
a transceiver; and
one or more registers configured to store the first and second transceiver identifiers;
wherein the transceiver is configured to access the first transceiver identifier responsive to the first enablement signal; and
wherein the transceiver is further configured to access the second transceiver identifier responsive to the second enablement signal.

5. The apparatus of claim 4, wherein:
the first transceiver identifier comprises a first media access control (MAC) address; and
the second transceiver identifier comprises a second MAC address.

6. The apparatus of claim 1, wherein:
the first one of the identities is associated with a security credential; and
the second one of the identities is not associated with the security credential.

7. An apparatus comprising:
a processor configured to execute one or more applications associated with a plurality of identities; and
one or more transceivers configured to transceive first wireless signals responsive to a first enablement signal, and to transceive second wireless signals responsive to a second enablement signal;
wherein the first wireless signals represent a first transceiver identifier associated with a first one of the identities;
wherein the second wireless signals represent a second transceiver identifier associated with a second one of the identities, and different than the first transceiver identifier;
wherein the processor is further configured to assert the first enablement signal responsive to occurrence of a first set of events; and
wherein the processor is further configured to assert the second enablement signal responsive to occurrence of a second set of events different than the first set, wherein the first set of events includes at least one event in a group including:
the apparatus being near a first selected object;
the apparatus not being near a second selected object;
the apparatus being near a first selected person or group of persons; and
the apparatus not being near a second selected person or group of persons.

8. Non-transitory, computer-readable media embodying instructions executable by a computer to perform functions comprising:
executing one or more applications associated with a plurality of identities associated with different levels of security;
enabling one or more transceivers to transceive first wireless signals responsive to occurrence of a first set of events, wherein the first wireless signals represent a first transceiver identifier associated with a first one of the identities; and
enabling the one or more transceivers to transceive second wireless signals responsive to occurrence of a second set of events different than the first set, wherein the second wireless signals represent a second transceiver identifier different than the first transceiver identifier, and associated with a second one of the identities.

9. The non-transitory, computer-readable media of claim 8, wherein the one or more transceivers include a first transceiver and a second transceiver, and wherein the functions further comprise:
enabling the first transceiver to transceive the first wireless signals responsive to occurrence of one or more of the first events; and
enabling the second transceiver to transceive the second wireless signals responsive to occurrence of one or more of the second events.

10. The non-transitory, computer-readable media of claim 9, wherein:
the first transceiver identifier comprises a first media access control (MAC) address; and
the second transceiver identifier comprises a second MAC address.

11. The non-transitory, computer-readable media of claim 8, wherein the functions further comprise:
storing the first and second transceiver identifiers;
providing the first transceiver identifier to one of the transceivers responsive to occurrence of one or more of the first events; and
providing the second transceiver identifier to the one of the transceivers responsive to occurrence of one or more of the second events.

12. The non-transitory, computer-readable media of claim 11, wherein:

the first transceiver identifier comprises a first media access control (MAC) address; and the second transceiver identifier comprises a second MAC address.

13. The non-transitory, computer-readable media of claim 8, wherein:

the first one of the identities is associated with a security credential; and the second one of the identities is not associated with the security credential.

14. Non-transitory, computer-readable media embodying instructions executable by a computer to perform functions comprising:

executing one or more applications associated with a plurality of identities;

enabling one or more transceivers to transceive first wireless signals responsive to occurrence of a first set of events, wherein the first wireless signals represent a first transceiver identifier associated with a first one of the identities; and enabling the one or more transceivers to transceive second wireless signals responsive to occurrence of a second set of events different than the first set, wherein the second wireless signals represent a second transceiver identifier different than the first transceiver identifier, and associated with a second one of the identities, wherein the first set of events includes at least one event in a group including:

the computer being near a first selected object;

the computer not being near a second selected object;

the computer being near a first selected person or group of persons; and the computer not being near a second selected person or group of persons.

15. A method for a computer in communication with one or more transceivers comprising:

executing one or more applications associated with a plurality of identities associated with different levels of security; and enabling the one or more transceivers to transceive first wireless signals responsive to occurrence of a first set of events, wherein the first wireless signals represent a first transceiver identifier associated with a first one of the identities; and enabling the one or more transceivers to transceive second wireless signals responsive to occurrence of a second set of events, wherein the second wireless signals represent a second transceiver identifier different than the first transceiver identifier, and associated with a second one of the identities.

16. The method of claim 15, wherein the one or more transceivers include a first transceiver and a second transceiver, and wherein the method further comprises:

enabling the first transceiver to transceive the first wireless signals responsive to occurrence of one or more of the first events; and enabling the second transceiver to transceive the second wireless signals responsive to occurrence of one or more of the second events.

17. The method of claim 16, wherein:

the first transceiver identifier comprises a first media access control (MAC) address; and the second transceiver identifier comprises a second MAC address.

18. The method of claim 15, further comprising:

storing the first and second transceiver identifiers;

providing the first transceiver identifier to one of the transceivers responsive to occurrence of one or more of the first events; and providing the second transceiver identifier to the one of the transceivers responsive to occurrence of one or more of the second events.

19. The method of claim 18, wherein:

the first transceiver identifier comprises a first media access control (MAC) address; and the second transceiver identifier comprises a second MAC address.

20. The method of claim 15, wherein:

the first one of the identities is associated with a security credential; and the second one of the identities is not associated with the security credential.

21. A method for a computer in communication with one or more transceivers comprising:

executing one or more applications associated with a plurality of identities associated;

enabling the one or more transceivers to transceive first wireless signals responsive to occurrence of a first set of events, wherein the first wireless signals represent a first transceiver identifier associated with a first one of the identities; and enabling the one or more transceivers to transceive second wireless signals responsive to occurrence of a second set of events different than the first set of events, wherein the second wireless signals represent a second transceiver identifier different than the first transceiver identifier, and associated with a second one of the identities, wherein the first set of events includes at least one event in a group including the computer being near a first selected object;

the computer not being near a second selected object;

the computer being near a first selected person or group of persons; and the computer not being near a second selected person or group of persons.

* * * * *